United States Patent [19]

Schäfer et al.

[11] Patent Number: 4,479,996
[45] Date of Patent: Oct. 30, 1984

[54] FORGERY-RESISTANT FILM AND METHOD OF USING SAME

[75] Inventors: Helmut Schäfer, Rüsselsheim; Manfred Unger, Schlangenbad, both of Fed. Rep. of Germany

[73] Assignee: Hoechst Aktiengesellschaft, Frankfurt am Main, Fed. Rep. of Germany

[21] Appl. No.: 287,574

[22] Filed: Jul. 28, 1981

Related U.S. Application Data

[62] Division of Ser. No. 084,551, Oct. 15, 1979, Pat. No. 4,341,833.

[30] Foreign Application Priority Data

Nov. 4, 1978 [DE] Fed. Rep. of Germany ... 7832840[U]

[51] Int. Cl.³ .................. B32B 7/02; B32B 27/36; G01N 21/02
[52] U.S. Cl. .................... 428/212; 73/159; 116/202; 356/432; 428/480; 428/482; 428/910; 428/916
[58] Field of Search .............. 428/212, 480, 482, 483, 428/910, 913, 916, 918; 156/64, 229; 427/7, 8; 73/159; 116/200, 202; 356/432

[56] References Cited

U.S. PATENT DOCUMENTS 4,041,206 8/1977 Tsunashima et al. ............... 428/480
4,198,458 4/1980 Mitsuishi et al. .................. 428/212

FOREIGN PATENT DOCUMENTS 7025989 7/1970 Fed. Rep. of Germany ...... 428/212

*Primary Examiner*—Bruce H. Hess
*Attorney, Agent, or Firm*—Schwartz, Jeffery, Schwaab, Mack, Blumenthal & Koch

[57] ABSTRACT

The film disclosed in the application is secure against forgeries and serves for marking articles, in particular high-quality branded goods. It is comprised of at least one transparent polyester film oriented by stretching and containing in its composition an organic dyestuff which is heat stable at temperatures above about 260° C. Preferably, a laminate is used which is comprised of two films, one of which contains a different colored dyestuff than does the other.

6 Claims, 1 Drawing Figure

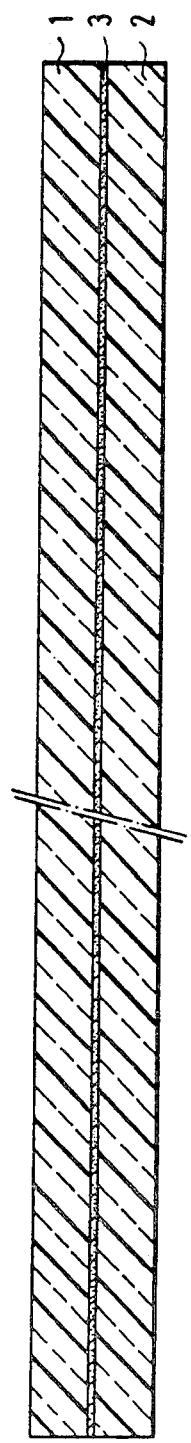

FORGERY-RESISTANT FILM AND METHOD OF USING SAME

This is a division of application Ser. No. 084,551, filed Oct. 15, 1979, now U.S. Pat. No. 4,341,833.

BACKGROUND OF THE INVENTION

The present invention relates to a film or sheet which is secure against forgeries, to the use of this film and to a method of marking articles, e.g., products or packages, from the file.

Well-known, high-quality branded goods, for example, phonograph records, music cassettes, pharmaceuticals or perfumery articles, are increasingly imitated without the consent of the original manufacturers. To keep the imitations from being easily detected as such, they are marketed in packages which, in their size and appearance, closely resemble the original packages. The customer will thus take the counterfeits for the original products. As the imitated goods are sold at comparatively low prices and are usually of inferior quality, the manufacturers of the authentic products will suffer considerable material damage and loss of business.

For the above-mentioned reasons, possibilities have been sought for some time now, of marking original products or the packages thereof in a simple manner, so as to protect them against forgeries.

SUMMARY OF THE INVENTION

It is, therefore, an object of the present invention to provide a film which is suitable for marking products or packages as a protective measure against forgeries.

A further object of the invention resides in providing such a film which, on the other hand, can be imitated only with difficulty and, on the other hand, can easily and quickly be identified.

It is also an object of the invention to provide an improved package which is resistant to forgeries.

Still another object of the invention resides in the provision of a method for producing an improved package of this type.

In accomplishing the foregoing objects, there has been provided in accordance with the present invention a film which offers protection against forgeries and is suitable for marking articles, comprising at least one transparent film oriented by stretching and comprised of a polyester resin and an organic dyestuff which is heat stable at temperatures above about 260° C. In a preferred embodiment, the film comprises two transparent polyester films joined to one another over their surfaces, wherein each layer comprises an organic dyestuff of a different color shade.

In accordance with another aspect of the present invention, there has been provided a method of marking articles to provide protection against forgeries, comprising the step of applying to the article to be marked a film as defined above.

Other objects, features and advantages of the present invention will become apparent from the detailed description of preferred embodiments which follows, when considered in light of the attached drawing.

BRIEF DESCRIPTION OF THE DRAWING

The FIGURE of drawing is a cross-sectional view of one preferred embodiment of the film according to the present invention.

DETAILED DESCRIPTION OF PREFERRED EMBODIMENTS

The present invention provides a film which is secure against forgeries and is thus adapted for marking articles, such as products and packages. The film according to the invention has the feature that it comprises at least one transparent polyester film oriented by stretching and containing in its composition an organic dyestuff which is heat stable at temperatures above 260° C.

A transparent film is preferably to be understood as being a film which has a transparency of at least 50% when exposed to light having a wavelength of 750 nm. The transparency shall be defined as the ratio between the light intensities of this wavelength measured with and without the interposed film sample, with the aid of an optical measuring arrangement according to DIN 53490. A film of this kind, which is used as a leader for a web-shaped information carrier (e.g., tape) has been described in U.S. Pat. No. 4,048,150, the disclosure of which is hereby incorporated by reference.

The film is manufactured by extrusion of the dyed polyester raw material. Most organic dyestuffs are unsuitable for this application, because they will disintegrate at the high extrusion temperatures which exceed 260° C., with the result that a turbid film having a high degree of light absorption will be obtained. Conventional inorganic fillers, for example, titanium dioxide, calcium carbonate or glass beads, have a sufficient heat stability, but they will also lead to opaque films and are, therefore, unsuitable.

It is, thus, an advantage of a film according to the invention that the number of usable, sufficiently heat stable dyestuffs and, consequently, also the number of possible color shades are limited. The transparency and the characteristic color shade may be recognized by the naked eye, so that there is no need for a complicated analysis of the film or of the dyestuff.

On the other hand, any subsequent printing of a plastic film with the dyestuff for the purpose of imitating the original marking strip can easily be detected as being a counterfeit by a scratch test.

Another typical feature distinguishing the film from other materials is its density, which is greater than 1. The film sinks when it is put into water.

In addition, the tear strength of the polyester film oriented by stretching can be tested in a simple manner by hand. As is known, the tear strength depends upon the stretching conditions and is preferably between about 270 and about 330 N/mm$^2$, particularly between about 280 and 300 N/mm$^2$. The thickness of the film is within the usual range and, depending upon the intended use, it may range from about 10 to about 40 μm.

Polyester can also easily be identified by the typical odor which develops when the material is burned.

In a preferred embodiment, the film comprises two transparent polyester films oriented by stretching, which are joined to one another over their surfaces and contain in their compositions organic dyestuffs of different color shades which are heat stable at temperatures above 260° C. The films are, for example, united by sealing or welding, preferably, however, by adhesive bonding. For sealing, resorcinol dissolved in ethyl acetate or benzyl alcohol are appropriately applied as auxiliary agents. At temperatures ranging from 150° to 175° C. the films which are to be joined are pressed together for a short time under a pressure of about 2 N/cm$^2$. Welding of the films may be carried out by the impulse process or the ultrasonic process. For the particularly advantageous adhesive bonding of the films, special adhesives must be used which are conventionally employed for laminating polyester films to polyester films. These commercial adhesives are usually solvent-containing, one or two-component adhesives based on polyurethane or polyester.

A roller system is used, for example, for applying the adhesive to the film. The solvents are removed in a drying device and then the surfaces to be bonded are pressed together and, if required, they are thermally activated.

Detrimental changes of the film surfaces do not occur in the bonding area. In the preferred embodiment, the film is composed, for example, of a red and a yellow layer. Viewed by reflected light against a dark background, especially a black background, the two color shades can be distinguished; however, by transmitted light, i.e., against a light background, particularly a white background, the orange, mixed color appears. Surprisingly, these color effects either cannot be achieved at all or can only inadequately be achieved by printing of the surfaces of the film.

For marking original products with the film according to the invention, the film is used, for example, as a packaging film or as a tear strip. It is also possible to apply the film directly to the product. For this purpose, a film strip is, for example, wrapped around, bonded to or welded to the product.

The manufacture of the film according to the invention is explained in more detail with reference to the following Examples 1 to 3. The polyester raw material is polyethylene terephthalate having an intrinsic viscosity i$\nu$ of 0.6 to 0.8.

EXAMPLE 1

161 kg of polyester chips are mixed with 21.8 kg of a master-batch of polyester and 0.8% by weight of anthraceno [2,1-m; 1,9a-n; 9a, 9-a] thioxanthene and, after drying, the mixture of granulates is fed into an extruder and extruded through a slot die in the conventional manner. After quenching the preliminary film which has a thickness of 300 $\mu$m, it is biaxially stretched and then heat set. The transparency of the red film having a thickness of 30 $\mu$m is 88% when exposed to light having a wavelength of 750 nm.

EXAMPLE 2

198.8 kg of dried and still hot polyester chips are drum-colored with 1.2 kg, corresponding to 0.6% by weight, of the dyestuff N-(n-octadecyl)-benzo[k,1] thioxanthene-3,4-dicarboximide, and the film is prepared as described in Example 1. The transparency of the yellow film having a thickness of 30 $\mu$m, is 87% when exposed to light having a wavelength of 750 nm.

EXAMPLE 3

A red and yellow film manufactured as specified in Examples 1 and 2, each of which has a thickness of about 19 $\mu$m, are united by laminating with the aid of a roll at room temperature using a commercially available solvent-containing, two-component adhesive based on polyurethane. The resulting laminate exhibits the abovedescribed characteristic color shades when viewed by reflected and transmitted light, and it is, therefore, particularly suitable for marking products as a protection against forgeries.

The accompanying drawing illustrates an embodiment of the film according to the invention. Reference numerals 1 and 2 in the drawing denote the two polyester films, and reference numeral 3 is the adhesive layer.

Due to its high transparency, the film produced as described in Example 3 is especially suitable for the manufacture of a leader in an information carrier tape, which is secure against forgeries. The transparency of the leader ensures that a running information carrier in the form of a web, for example, a magnetic tape, can be switched off photoelectrically: when the magnetic tape is unreeled and reaches its end, the leader moves past a photoelectric cell which receives an optical signal by light passing through the sufficiently transparent material. As a result, the running tape is stopped. A laminate for use as a leader preferably has a total thickness from about 28 to 30 $\mu$m.

In addition to the above-mentioned advantages, the film exhibits a good heat-sealability if resorcinol or benzyl alcohol are appropriately used, and it may be ultrasonically welded without difficulty. If an adhesive tape is employed, the adhesive agent does not cause any detrimental changes of the film surface.

What is claimed is:

1. A method of marking an article to provide protection against forgery comprising the step of applying to the article to be marked a film comprising a laminate comprised of two transparent films joined to one another over their surface, each of said films being oriented by stretching and being comprised of a polyester resin and in admixture therewith an organic dyestuff which is heat stable at temperatures above about 260° C., wherein one of the laminated transparent film layers comprises as the dyestuff anthraceno [2, 1-m; 1,9 a-n; 9a, 9-a] thioxanthene and the other film layer comprises as the dyestuff N-(n-octadecyl)-benzo [k,1] thioxanthene-3,4-dicarboximide.

2. A method according to claim 1 wherein said film has a transparency of at least 50 percent when exposed to light having a wave length of 750 nm.

3. A method according to claim 1 or 2 wherein said film is applied to the article to be marked by wrapping the article in the film.

4. A method according to claim 1 or 2 wherein said film is attached to the article to be marked by securing a strip of said film to the article.

5. A method of protecting an article against forgery, comprising the steps of:
  applying a laminate to the outside of the article, said laminate comprising two transparent polyester films, each film layer comprising a different organic dyestuff which is heat stable at temperatures above about 260° C. and each of said dyestuffs having a different chemical structure and exhibiting a different characteristic color;
  directing a light beam onto said laminate; and
  detecting the color pattern of said dyestuffs, whereby said laminate exhibits one characteristic color when viewed by transmitted light and each of said film layers exhibits a different characteristic color when viewed by reflected light.

6. A method as defined by claim 5, wherein said color pattern is detected by the naked eye.

* * * * *